(12) United States Patent
Heren et al.

(10) Patent No.: US 7,066,403 B2
(45) Date of Patent: Jun. 27, 2006

(54) SPRINKLING SYSTEM AND METHOD

(75) Inventors: Lawrence Heren, East Peoria, IL (US); Michael Breedlove, Sr., Hanna City, IL (US); Scott Jacobs, Peoria, IL (US)

(73) Assignee: L.R. Nelson Corporation, Peoria, IL (US)

( * ) Notice: Subject to any disclaimer, the term of this patent is extended or adjusted under 35 U.S.C. 154(b) by 230 days.

(21) Appl. No.: 10/289,954

(22) Filed: Nov. 7, 2002

(65) Prior Publication Data
US 2004/0089738 A1 May 13, 2004

(51) Int. Cl.
*A62B 18/00* (2006.01)

(52) U.S. Cl. .................. 239/271; 239/272; 239/276

(58) Field of Classification Search ............. 239/271, 239/272, 273, 276, 280, 288, 288.3
See application file for complete search history.

(56) References Cited

U.S. PATENT DOCUMENTS

| | | | |
|---|---|---|---|
| 443,914 A * | 12/1890 | Heren et al. ............. 172/363 |
| 481,444 A * | 8/1892 | Guo ....................... 140/74 |
| 2,196,456 A | 4/1940 | Charroin |
| 2,563,300 A | 8/1951 | Aker |
| 2,760,824 A | 8/1956 | Leadbetter |
| 3,240,434 A | 3/1966 | Bradley |
| 3,633,826 A | 1/1972 | Baker |
| 3,750,956 A | 8/1973 | Mastman |
| 3,777,980 A | 12/1973 | Allport |
| 3,806,031 A | 4/1974 | Olson |
| 3,885,742 A | 5/1975 | Menzel |
| 3,918,646 A | 11/1975 | Leal-Diaz et al. |
| 3,929,288 A * | 12/1975 | Brusadin et al. ........... 239/201 |
| 3,994,441 A | 11/1976 | Testa |
| 4,084,750 A * | 4/1978 | Fett ....................... 239/600 |
| 4,087,049 A * | 5/1978 | Traina ................... 239/267 |
| 4,273,286 A | 6/1981 | Menzel |
| 4,365,750 A * | 12/1982 | Carlberg ................. 239/276 |
| 4,452,397 A | 6/1984 | Barton |
| 4,732,329 A | 3/1988 | Martin |
| 4,779,800 A | 10/1988 | Tuomi |
| 4,787,557 A | 11/1988 | Jackson |
| 4,852,806 A | 8/1989 | Zeman |
| 5,158,231 A * | 10/1992 | Christen et al. ............ 239/276 |
| 5,172,515 A * | 12/1992 | Lapshansky et al. ........ 47/48.5 |
| 5,211,338 A * | 5/1993 | Leite et al. ............... 239/276 |
| 5,234,169 A | 8/1993 | McKenzie |
| 5,337,993 A | 8/1994 | Hersman |
| 5,385,300 A | 1/1995 | Sims, Jr. |
| 5,694,972 A | 12/1997 | King |
| 6,302,335 B1 | 10/2001 | Ormiston et al. |
| 6,336,599 B1 * | 1/2002 | Herr et al. ............... 239/522 |
| 6,394,368 B1 | 5/2002 | Hintz |
| 6,554,209 B1 * | 4/2003 | Djordjevic ............... 239/276 |
| 2003/0111550 A1 * | 6/2003 | Kuo ....................... 239/240 |

FOREIGN PATENT DOCUMENTS

FR WO 92/20213 * 11/1992
GB 2151946 A * 7/1985

* cited by examiner

*Primary Examiner*—Mohammad M. Ali
(74) *Attorney, Agent, or Firm*—Mayer, Brown, Rowe & Maw LLP

(57) ABSTRACT

The invention relates to a sprinkling system. The system comprises a body portion comprising a housing and a spike depending downward from the housing, wherein the housing comprises a lower platform and an upwardly open U-shaped groove aligned along a center line of the platform for holding the tubing. The system comprises a saddle adapted to fit within the housing, the saddle comprising a top face having an outlet therein, and a bottom face having downwardly open inverted U-shaped groove depending therefrom. The system also comprises a hollow piercing element extending from the bottom face of the saddle to a point above the platform and in fluid communication with the outlet. The system further comprises a cap adapted to fit over the saddle, wherein securing the cap to the body portion is achieved without rotating the piercing element.

62 Claims, 7 Drawing Sheets

SPRINKLING SYSTEM AND METHOD

BACKGROUND OF THE INVENTION

1. Field of the Invention

The present invention relates to a sprinkling system and method. Particularly, the present invention is directed to a sprinkling system and method for providing a sprinkling system to water an area of land wherein the system is easy to install and use.

2. Description of Related Art

A variety of methods, systems and products are known for watering lawn and garden areas. Such methods, systems and products generally comprise above ground sprinklers attached to a garden hose, in-ground sprinkling systems, and micro irrigation type above ground sprinkler systems.

Such conventional methods and systems generally suffer from distinct disadvantages. Sprinklers, for example, although widely used, are not suitable for sprinkling disjointed or irregularly shaped areas. In-ground sprinkling systems, though easily configurable to disjointed or irregularly shaped areas, are expensive and time consuming to install. In addition, in-ground systems require extensive trenching and pipe laying in the area to be watered, numerous components, electrical connections, and high maintenance. Moreover, the "do-it-yourself" gardener cannot easily install and configure these systems without professional help or supervision.

Another system, micro irrigation, resolves some of the issues of the in-ground systems but still suffers from major disadvantages. In the micro irrigation systems, a main supply line is laid in an area to be watered. A tool is provided to poke holes in the supply line at desired intervals. Couplers are provided that are inserted into the holes by the end user, and a smaller diameter secondary feed tube is attached to the connector. The feed tube is cut to a desired length and attached to a spike holding a nozzle. The disadvantages of this system are many. First, there are numerous components, including spikes, nozzles, tubing lines, couplers and piercing tools. Second, the assembly is relatively complicated and requires a number of discrete steps, i.e., piercing the supply tubing, attaching a coupler, attaching feed tubes, and then attaching nozzles. Third, because of the use of so many different components, it is difficult to market the micro irrigation systems at a retail level.

Other systems, though simpler than the micro irrigation systems, also suffer from disadvantages. Such systems include sprinkler hoses, i.e., hoses with holes placed at intervals along the hose. The hoses are connected to a water source, and a spray of water is emitted from the holes. Such hoses are difficult to aim and cannot be arranged in a user-determined watering pattern. Other systems include soaker hoses. With soaker hoses, a porous material is connected to a water source so that water can ooze out of the porous hose into the ground where the hose is laid. Soaker hoses cannot be set up in a user-defined watering pattern.

There thus remains a need for an efficient and economic method and system for providing a sprinkling system that has a minimum of separate parts and can be easily installed and configured.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention comprises several new and useful embodiments. In brief, one embodiment of the invention is a sprinkling system for use with a fluid carrying tubing, the system comprising: a body portion comprising a housing and a spike depending downward from the housing, wherein the housing comprises a lower platform and an upwardly open U-shaped groove aligned along a center line of the platform for holding the tubing; a saddle adapted to fit within the housing, the saddle comprising a top face having an outlet therein, a bottom face having downwardly open inverted U-shaped groove depending therefrom; a hollow piercing element for piercing a top wall of the tubing placed in the U-shaped groove, the piercing element extending from the bottom face of the saddle to a point above the platform and in fluid communication with the outlet; a cap adapted to fit over the saddle; and a means for securing the cap to the body portion; wherein securing the cap to the body portion produces a downward force on the piercing element without rotating the piercing element. According to the preferred embodiments, no tools are required and the entire system may be set up by hand. In some embodiments, the piercing element and saddle are integrated. Other nozzle attachments can be connected to the outlet for even more configurability.

The invention also includes a method for installing the sprinkling system comprising: providing tubing for carrying a fluid, the tubing having a first end for connection to a fluid source and a second opposite end; providing a body portion comprising a housing and a spike depending downward from the housing, wherein the housing comprises a lower platform and an upwardly open U-shaped groove aligned along a center line of the platform for holding the tubing; providing a saddle adapted to fit within the housing, the saddle comprising a top face having an outlet therein, a bottom face having downwardly open inverted U-shaped groove depending therefrom; providing a hollow piercing element for piercing a top wall of the tubing placed in the U-shaped groove, the piercing element extending from the bottom face of the saddle to a point above the platform and in fluid communication with the outlet; providing a cap adapted to fit over the saddle; and providing a means for securing the cap to the body portion; inserting the spike into the ground in the area to be watered; placing the tubing in the U-shaped groove; placing the saddle and piercing element over the tubing; and securing the cap to the body portion to pierce the tubing with the piercing element without rotating the piercing element.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Figure 1:
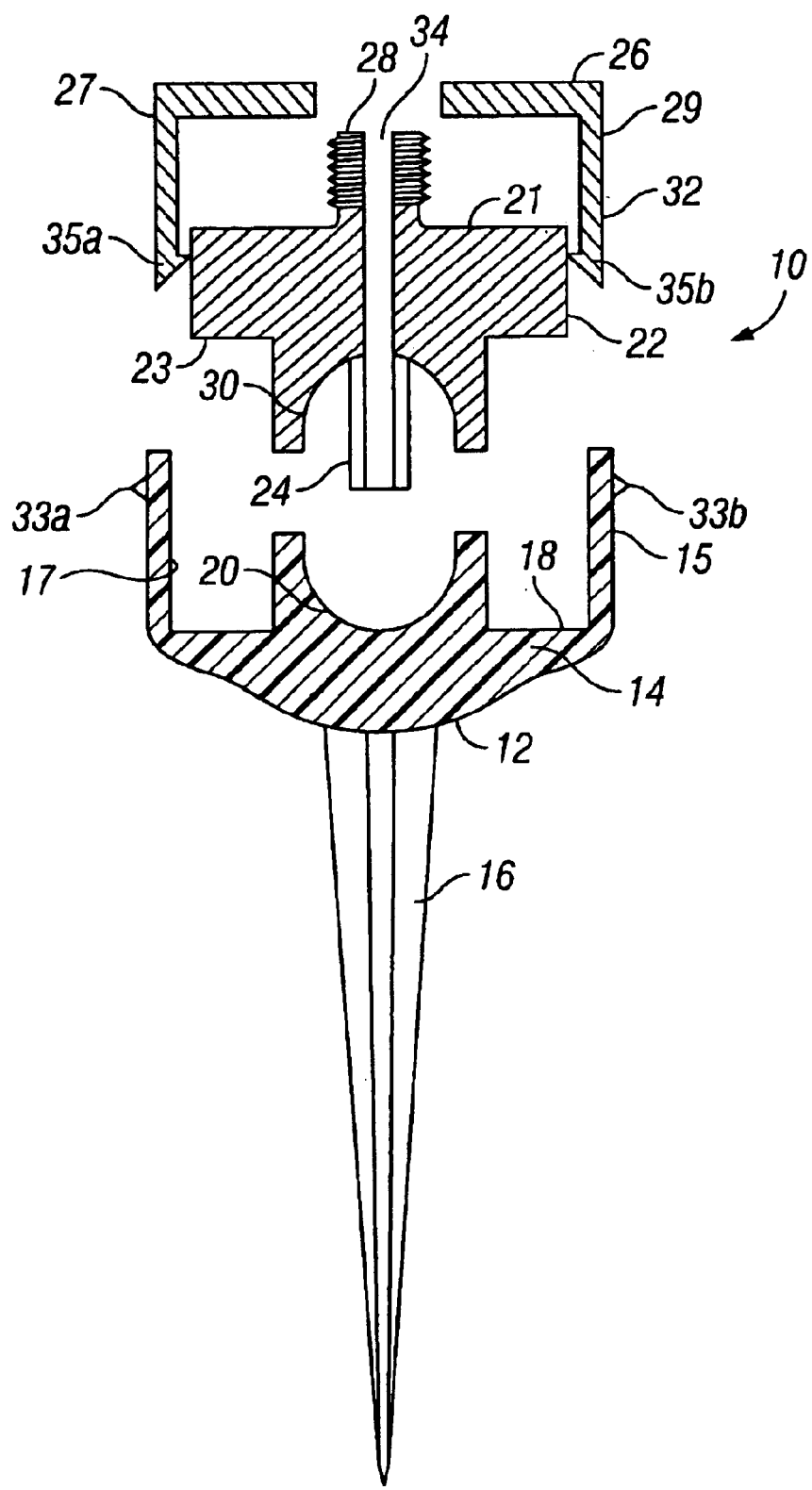
FIG. 1 is an exploded cross section of an embodiment in accordance with the invention.

Reference will now be made in detail to the present preferred embodiments of the invention, examples of which are illustrated in the accompanying drawings.

The embodiments presented herein may be used for watering any area of land in need of water wherein there is access to a fluid source. The present embodiments are particularly suited for lawns and gardens. For purpose of explanation and illustration, and not limitation, a first exemplary embodiment of the system in accordance with the invention is shown in FIG. 1 and is designated generally by reference character 10.

As shown in FIG. 1, the system 10 generally comprises a body portion 12 comprising a housing 14 and spike 16 depending downwardly therefrom, a saddle 22 having an outlet 28 therein, a piercing element 24 and a cap 26. A water passage 34 is provided between the piercing element 24 and outlet 28. Also provided is a means for securing the cap 26 to the body portion 12, in the present embodiment (although not necessarily) complementary protrusions 35a, 35b and grooves 33a, 33b, such that when the cap 26 is secured to the body portion 12, a downward force is exerted and the piercing element 24 without rotating the piercing element 24.

Figure 2:
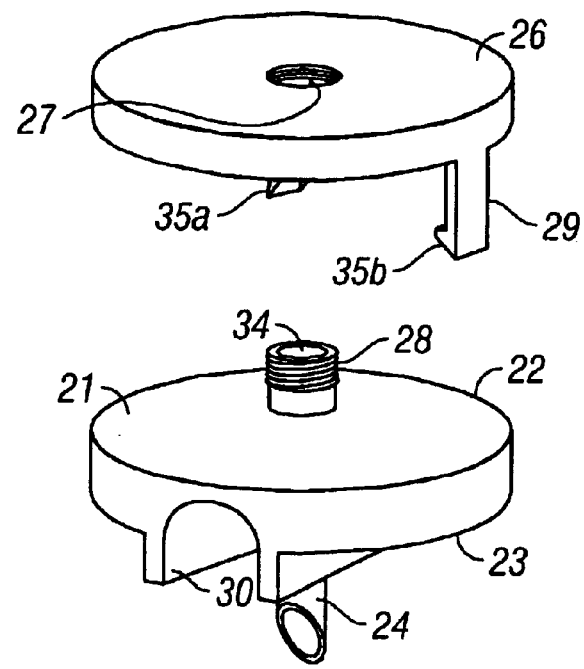
FIG. 2 is an exploded perspective view of the embodiment shown in FIG. 1.
Figure 2:
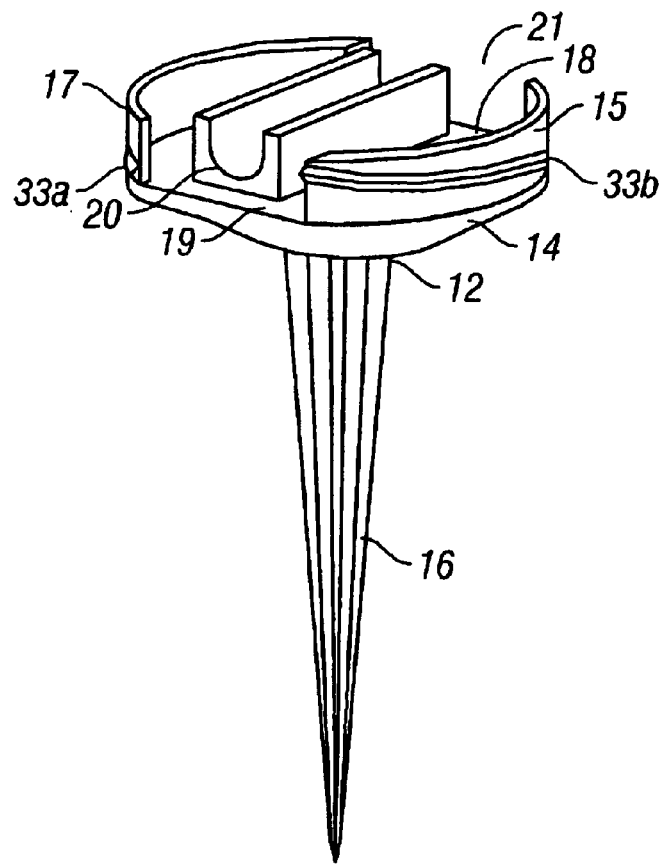

Specifically, and in accordance with the present embodiment, the body portion 12 comprises a housing 14 and spike 16. The spike 16 may have an X-shaped cross section for rigidity. Other shapes, such as round spikes, Y-shaped spikes, or other shapes may be used. In practice, the spike 16 is inserted into the ground so that the housing 14 can be at approximately ground level. The spike 12 maybe made of a metal, such as zinc, or plastic. The housing 14 comprises a lower platform 18 and a U-shaped groove 20 aligned along a center line of the platform 20 (see FIG. 2). The housing 14 may also comprise a pair of semi-cylindrical walls 15, 17 extending upwardly from the edges of the platform 18. The walls 15, 17 define a pair of opposite openings 19, 21 collinear with the U-shaped groove 20. The U-shaped groove 20 and openings 19, 21 set the placement of a fluid-carrying tubing.

Figure 3:
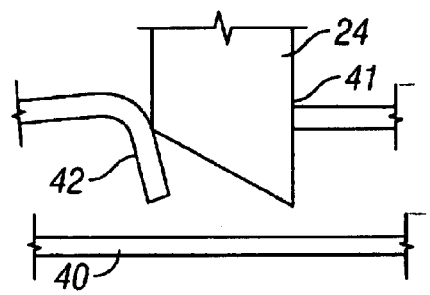
FIG. 3 depicts the piercing element in accordance with an embodiment of the invention.

The system 10 further comprises a saddle 22 adapted to fit within the housing 14. The saddle 22 has a top face 21, a bottom face 23 and an inverted U-shaped groove 30 depending downward from the bottom face 23. The saddle may be any shape, including round or square, depending on the choice of the designer and the shape of the body portion. In a preferred embodiment, a piercing element 24 is provided integrated with the bottom face 23 of the saddle 22 in the middle of the U-shaped groove 30. The piercing element 24 comprises a hollow piece in fluid communication with an outlet 28 emanating from the top face 21 of the saddle 22. The piercing element is wedge shaped at its piercing end and is arranged perpendicular to the flow of the fluid through the fluid supply tube 40 (see FIG. 3). This method of piercing cuts most of the way around the communicating hole, but leaves an attachment on one side creating a flap 42. This arrangement keeps the flap 42 from covering the opening in the piercing element 24 and thereby blocking the flow of fluid into the water passage 34. The piercing element can be made of metal, such as zinc, stainless steel, or brass, plastic, or other suitable material resistant to bending or breaking and able to retain a sharp edge upon exertion of a force sufficient to pierce the tubing.

Figure 4:
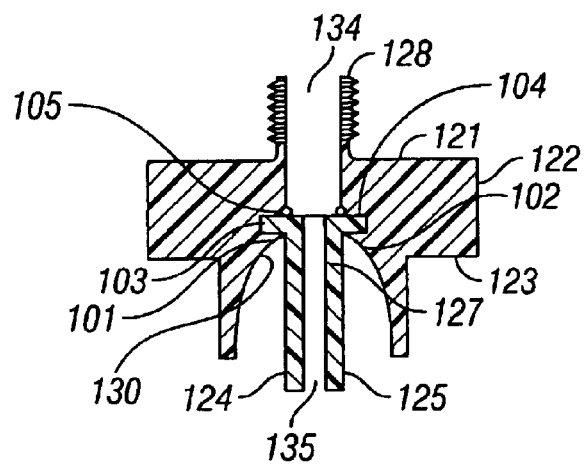
FIG. 4 depicts a piercing element and saddle in accordance with an embodiment of the invention.

In an alternative embodiment, depicted in FIG. 4, the piercing element 124 is separated from the saddle 122. In this embodiment, the saddle 122 comprises resilient protrusions 101, 102 at the top of the U-shaped groove 130. The resilient protrusion could also extend around the opening wherein the piercing element 124 is to be inserted into the saddle. The piercing element 124 comprises a piercing portion 125 and an upper attachment portion 127. The attachment portion 127 comprises a pair of members 103, 104 for deforming the protrusions 101, 102 and locking the attachment portion 127 of the piercing element 124 into the saddle 122. An o-ring 105 or other sealing member may be provided between the piercing element 124 and the saddle 122. However, in other embodiments, the piercing element may be overmolded to the saddle, obviating the need for an o-ring. The mating of the piercing element 124 and saddle 122 creates a contiguous water passage 134 through the piercing element 124 to the outlet 128. In yet further embodiments comprising means for connecting the piercing element 24 with the saddle 22, the piercing element 24 may screw into the saddle 22. In such embodiments, it is preferable that the threading for the screwable engagement provide for orientation of the opening of the piercing element to be aligned perpendicular to the flow of water through the tube, for the reasons set forth above.

Figure 5:
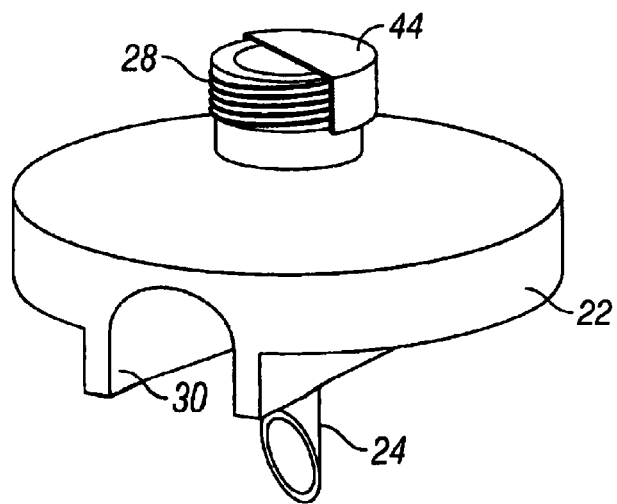
FIG. 5 depicts a nozzle attachment in accordance with an embodiment of the invention.

The outlet 28 emanating from the top face 21 of the saddle 22 can be of any design suitable for spraying a pattern of water. The outlet 28 can also be attached to any of a variety of nozzle attachments, including without limitation impact nozzle attachments, risers, pulsating nozzles, or nozzles having water outlets defining a decorative pattern. The outlet 28 maybe provided with external threading to facilitate connection to such-nozzle attachments. FIG. 5 depicts an embodiment of the system 10 wherein a deflector cap 44 is attached to the outlet 28. The deflector cap 44 covers a portion of the outlet 28 to provide for direction spraying out of the outlet 28.

The system 10 further comprises a cap 26 adapted to fit over the saddle 22. In the preferred embodiment, the cap 26 is generally disc-shaped having side walls 27, 29 having protrusions 35a, 35b thereon for engagement with ridges 33a, 33b on the side walls of the housing to provide a means for securing the cap 26. The cap 26 may be placed over the housing 14 and saddle 22 with the side walls 27, 29 between openings 19, 21. When the cap 26 is turned approximately ½ turn, the protrusions 35a, 35b engage underneath the ridges 33a, 33b and force the cap 26 downward. As the cap 26 is secured, the downward motion exerts a downward force on the top face 21 of the saddle 22, lowering the saddle 22 and piercing element 24 until a tubing placed in the U-shaped groove 20 is pierced by the piercing element 24. Because the cap 26 and saddle 22 are disassociated, the cap 26 can be rotated to force down the piercing element 24 without rotating the piercing element 24.

Figure 6:
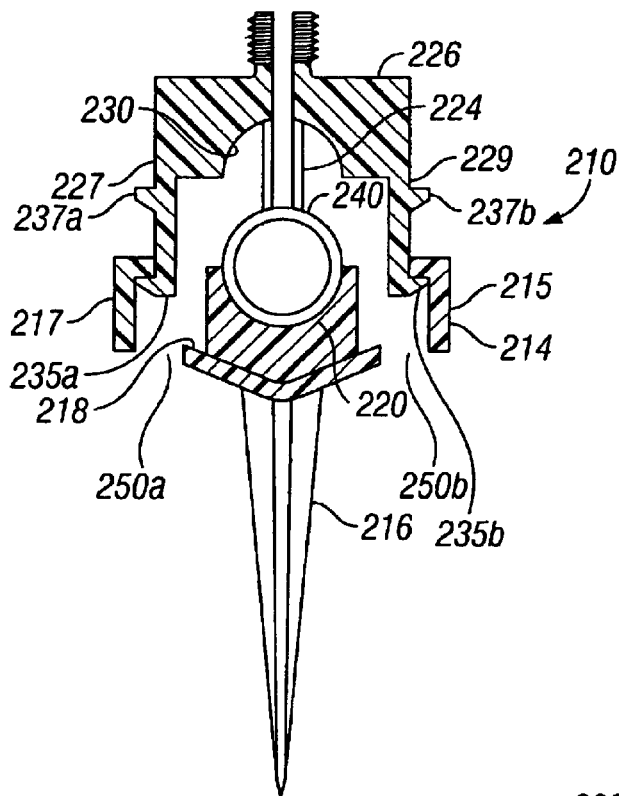
FIG. 6 is an exploded cross section of an embodiment in accordance with the invention.
Figure 7:
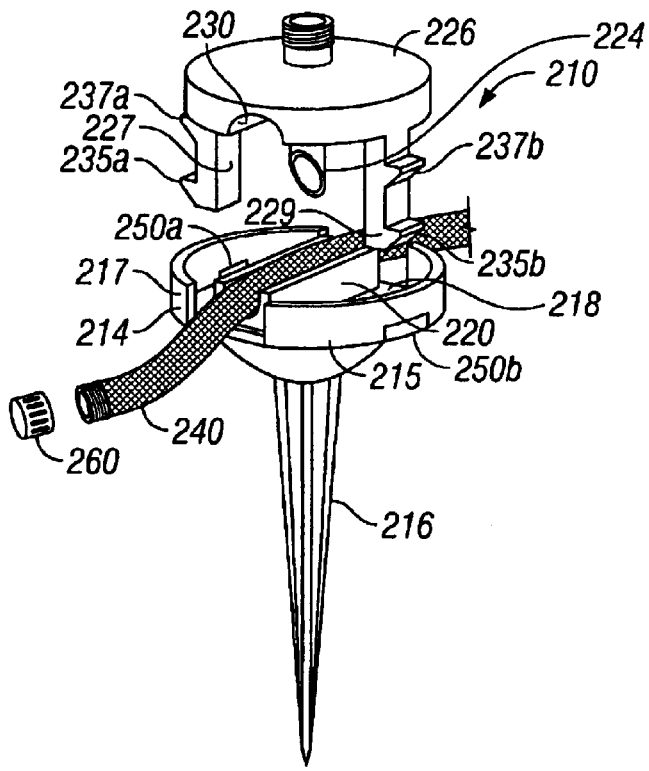
FIG. 7 is an exploded perspective view of the embodiment shown in FIG. 6.

Other means may be provided for securing the cap to the housing, including means wherein the cap and saddle are configured as a single cover portion. It should be appreciated that although certain securing means permit one-piece configuration of the cap and saddle and may be shown as such herein, it is not necessary that such securing means be used exclusively with the one-piece configuration. FIGS. 6 and 7 depict one alternative embodiment 210 comprising a securing means comprising a system of locking clips. In this embodiment, the cover portion 226 comprises a plurality of gripping members 227, 229 having protrusions 235a, 235b at bottom ends thereof and, preferably, additional protrusions 237a, 237b above the lower protrusions 235a, b. The housing 214 comprises slots 250a, 250b adapted to receive the gripping members 227, 229. The slots 250a, 250b are located along the outer edge of the platform 218 at the base of the side walls 215, 217. As the cover portion 226 is lowered onto the housing 214, the gripping members 227, 229 fit inside the side walls 215, 217 and into slots 250a, 250b. The gripping members 227, 229 pinch inward as the protrusions 235a, 235b engage the slots 250a, 250b, locking the cap into place. As the cap is locked into place, the piercing element 224 is forced downward so as to pierce the top wall of tubing 240.

Figure 8:
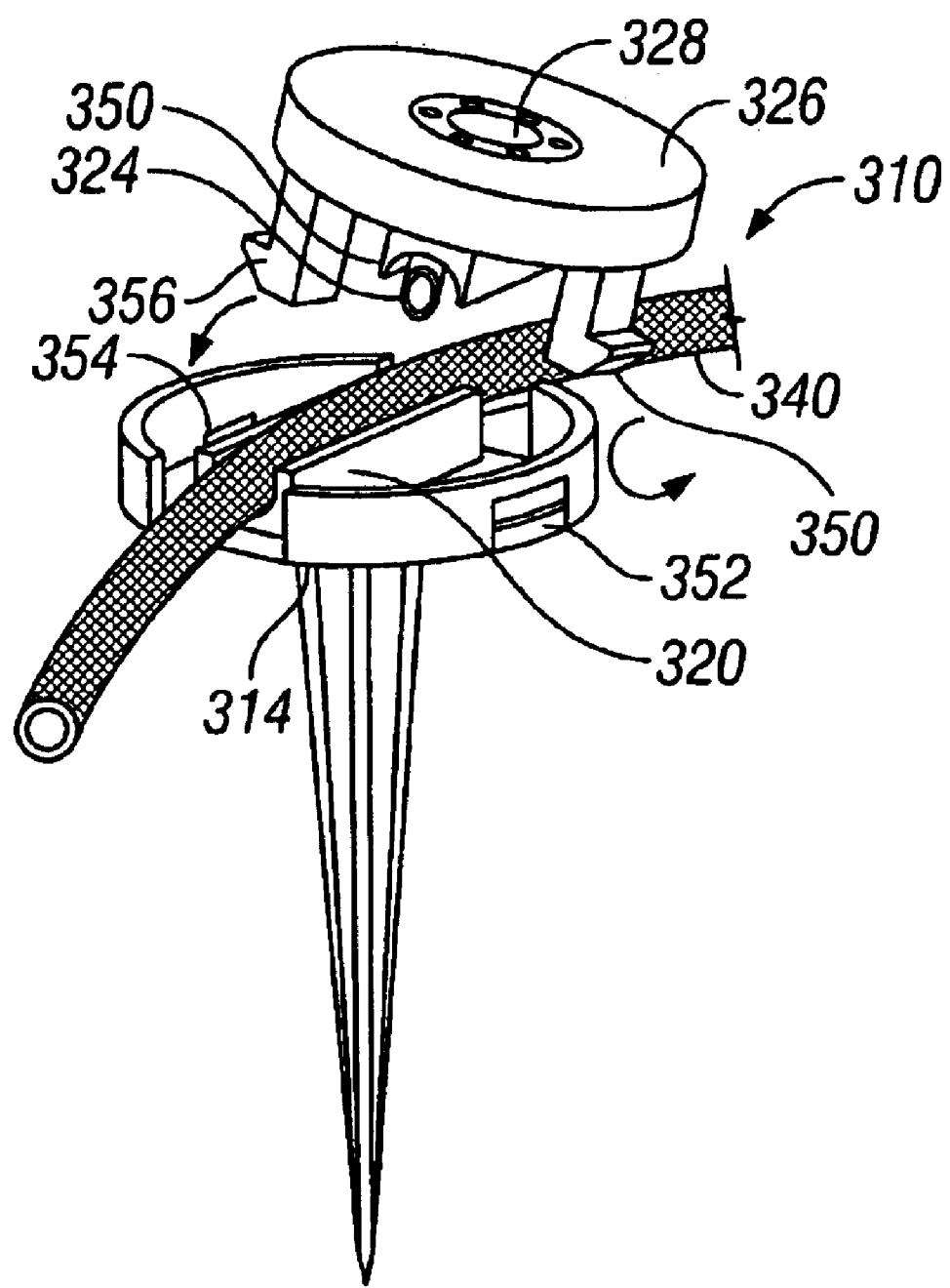
FIG. 8 is an embodiment in accordance with the invention.

FIG. 8 depicts a system 310 comprising yet another means for securing the cap or cover portion 326 to the housing 314. This embodiment utilizes a latch 350 which is inserted around a bar 352 in the side of the housing 314. The latch 350 and bar 352 provide a hinge point for the cover portion 326 to pivot down and have notch 356 engage opening 354 to lock the cover portion 326 into place. As the cover portion 326 is secured, the piercing element 324 pierces the tubing 340. In this embodiment as well, outlet 328 has a decorative spraying pattern arrangement.

Figure 9:
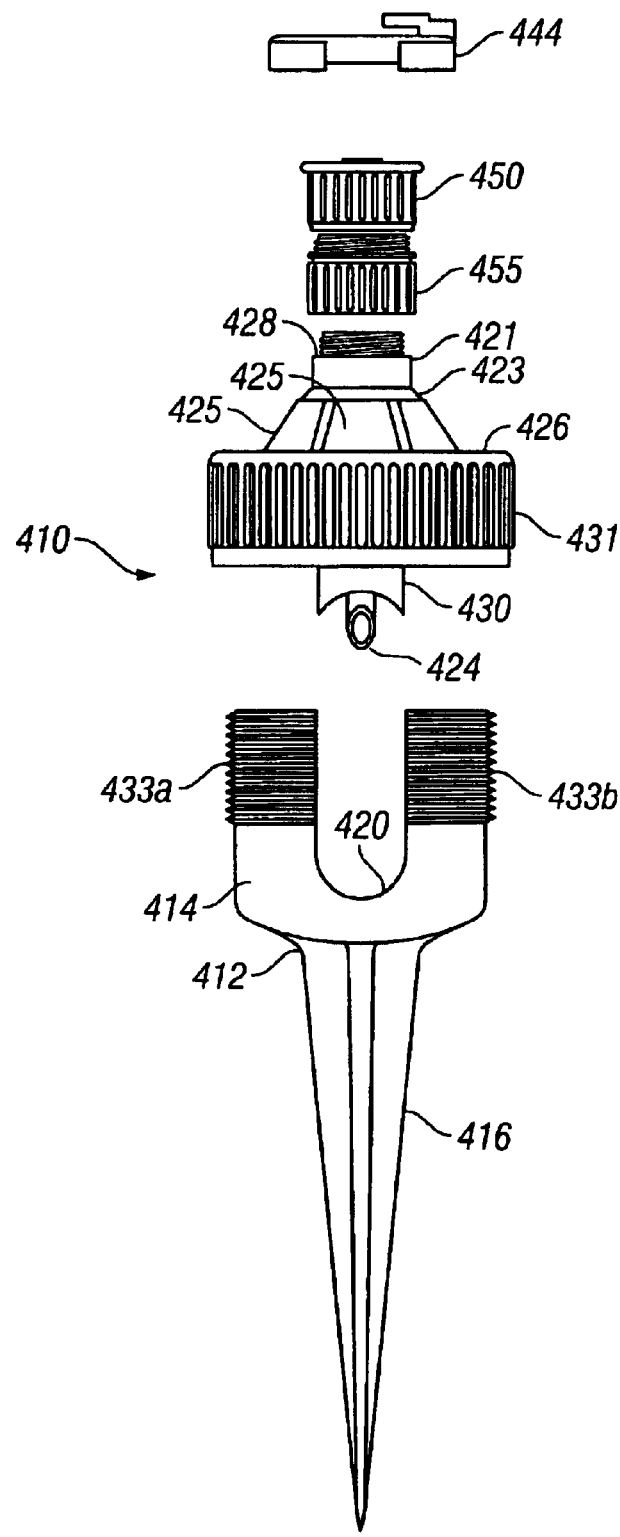
FIG. 9 is an exploded elevated view of an embodiment in accordance with the invention.
Figure 10:
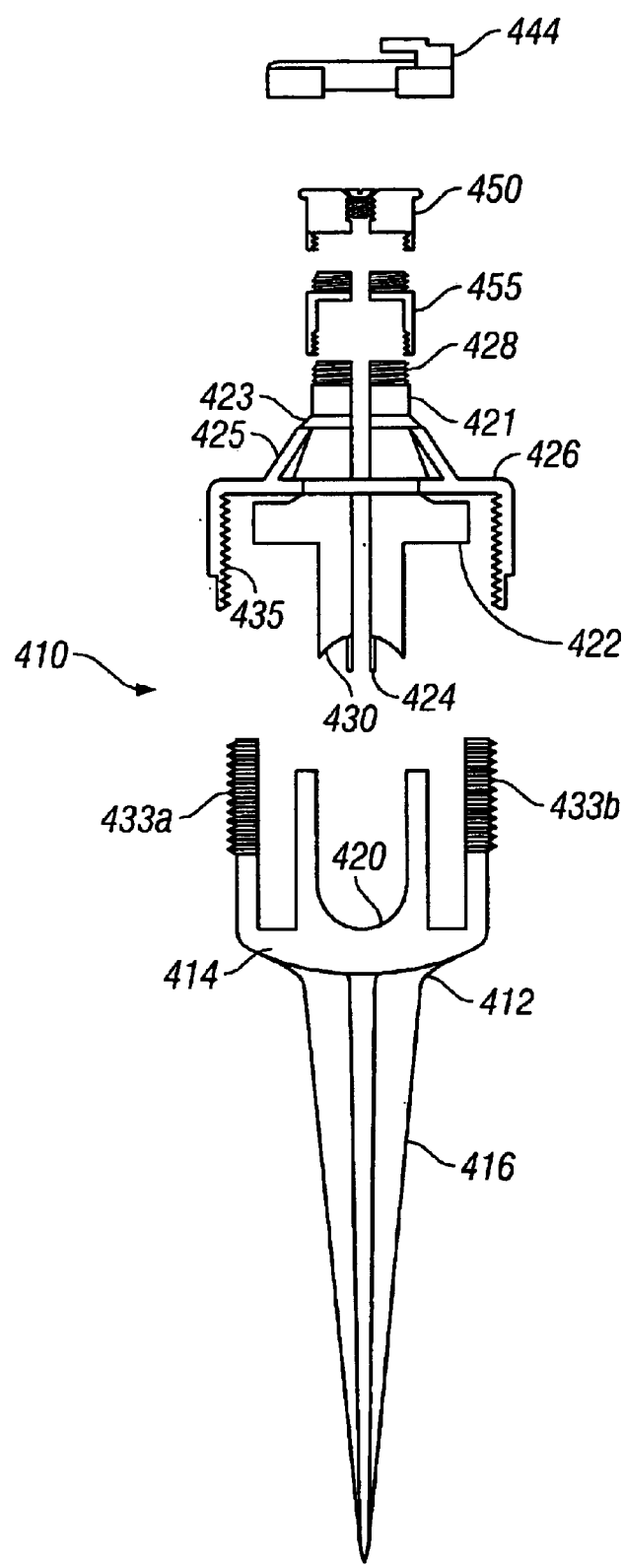
FIG. 10 is an exploded cross section view of the embodiment shown in FIG. 9.

FIGS. 9 and 10 depict yet another embodiment 410 of the present invention. This embodiment depicts several alternative features of the present invention. In this embodiment 410, the means for securing the cap 426 to the housing 414 is through a threaded engagement between external threading 433a, 433b on respective side walls of the housing 414 and internal threading 435 on the cap 426. As the cap 426 is threaded onto the housing 414, the saddle 422 and piercing element 424 are forced downward into U-shaped groove 420 thereby piercing tubing without rotation of the piercing element 424. Further in this embodiment, the saddle 422 comprises a lip portion 423 such that the cap 426 can be inserted over the saddle 422. As the cap 426 is screwed on, or prior to connection to the housing 414, the protruding ribs 425 on the cap 426 engage the lip portion 423 and lock the cap 426 to the saddle 422. The cap may have a knurled surface 431 or some other contour to allow enhanced gripping and turning. For example, the surface may comprise some other raised contour or a rubber material.

This embodiment further comprises a flow control nozzle attachment 450 known in the turf irrigation art. A deflector cap 444 which snaps around and over nozzle piece 450 is also provided in some embodiments to allow for direction control of the water spraying. In further embodiments, a riser 455 may be provided between the outlet 428 and the nozzle 450. It should be understood that the riser 455 may be of any desired height.

The systems according to embodiments of the present invention have several conveniences. For example, the system comprising individual system components (e.g., the saddle and cap or cover portion, the piercing element if separate, the body portion and the tubing) may all be sold separately or together as kits. For example, a kit may comprise a single tubing to be connected to a fluid source and several sprinkling system components to allow the user to lay the tubing in a desired pattern and water at desired intervals. A plug or end cap 260 (see FIG. 7) may be provided to plug the opposite end of the tubing once the watering configuration has been established. Thus, an efficient and easy to use watering system with a minimum of pieces is achieved.

In practice, the sprinkler system may be installed by providing the necessary above described components, placing the body portion in the ground by inserting the spike into the ground at a location to be watered, laying the tubing in the U-shaped groove, placing the saddle and piercing element over the tubing, and securing the cap to the housing. A downward force is thereby producing on the piercing element causing piercing of the tubing and flow out of the outlet. Risers, nozzles, deflector caps or other nozzle attachments may also be provided and connected.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A sprinkling system for use with a fluid carrying tubing, the system comprising:
   a body portion comprising a housing and a spike depending downward from the housing, wherein the housing comprises a lower platform and an upwardly open U-shaped groove aligned along a center line of the platform for holding the tubing;
   a saddle adapted to fit within the housing, the saddle comprising a top face having an outlet therein, a bottom face having downwardly open inverted U-shaped groove depending therefrom;
   a hollow piercing element for piercing a top wall of the tubing placed in the U-shaped groove, the piercing element extending from the bottom face of the saddle to a point above the platform and in fluid communication with the outlet;
   a cap adapted to fit over the saddle; and
   a means for securing the cap to the body portion;
   wherein securing the cap to the body portion produces a downward force on the piercing element without rotating the piercing element.

2. The system of claim 1 wherein the piercing element is integrated with the saddle.

3. The system of claim 1 wherein the securing means comprises a threaded engagement between the cap and the housing.

4. The system of claim 1 further comprising a nozzle attachment connected to the outlet.

5. The system of claim 1 wherein the piercing element is wedge shaped and aligned perpendicular to the tubing.

6. The system of claim 1 wherein the body portion is made of plastic.

7. The system of claim 1 wherein the housing further comprises a pair of approximately semi-cylindrical walls extending upward from opposite edges of the platform, wherein the cylindrical walls define a pair of opposite openings aligned along the center line.

8. The system of claim 1 wherein securing means comprises a plurality of locking clips.

9. The system of claim 1 wherein the piercing element is made of plastic.

10. The system of claim 1 wherein the piercing element is made of metal.

11. The system of claim 4 wherein the nozzle attachment is a flow control nozzle.

12. The system of claim 1 further comprising a deflector cap.

13. The system of claim 1 wherein the cap has a grip-enhancing outer surface.

14. The system of claim 1 further comprising a riser.

15. The system of claim 1 wherein the body portion is made of metal.

16. A sprinkling system comprising:
   tubing for carrying a fluid, the tubing having a first end for connection to a fluid source and a second opposite end;
   a body portion comprising a housing and a spike depending downward from the housing, wherein the housing comprises a lower platform and an upwardly open U-shaped groove aligned along a center line of the platform for holding the tubing;
   a saddle adapted to fit within the housing, the saddle comprising a top face having an outlet therein, a bottom face having downwardly open inverted U-shaped groove depending therefrom;
   a hollow piercing element for piercing a top wall of the tubing placed in the U-shaped groove, the piercing element extending from the bottom face of the saddle to a point above the platform and in fluid communication with the outlet;
   a cap adapted to fit over the saddle; and
   a means for securing the cap to the body portion;
   wherein securing the cap to the body portion produces a downward force on the piercing element without rotating the piercing element.

17. The system of claim 16 further comprising an end cap for plugging the opposite end of the tubing.

18. The system of claim 16 wherein the piercing element is integrated with the saddle.

19. The system of claim 16 wherein the securing means comprises a threaded engagement between the cap and the housing.

20. The system of claim 16 further comprising a nozzle attachment connected to the outlet.

21. The system of claim 16 wherein the piercing element is wedge shaped and aligned perpendicular to the tubing.

22. The system of claim 16 wherein the body portion is made of plastic.

23. The system of claim 16 wherein the housing further comprises a pair of approximately semi-cylindrical walls extending upward from opposite edges of the platform, wherein the cylindrical walls define a pair of opposite openings aligned along the center line.

24. The system of claim 16 wherein securing means comprises a plurality of locking clips.

25. The system of claim 16 wherein the piercing element is made of plastic.

26. The system of claim 16 wherein the piercing element is made of metal.

27. The system of claim 20 wherein the nozzle attachment is a flow control nozzle.

28. The system of claim 16 further comprising a deflector cap.

29. The system of claim 16 wherein the cap has a grip-enhancing outer surface.

30. The system of claim 16 further comprising a riser.

31. The system of claim 16 wherein the body portion is made of metal.

32. A sprinkling system for use with a fluid carrying tubing, the system comprising:
   a body portion comprising a housing and a spike depending downward from the housing, wherein the housing comprises a lower platform and an upwardly open U-shaped groove aligned along a center line of the platform for holding the tubing;
   a cover portion comprising a top face having an outlet therein, and a bottom face having downwardly open inverted U-shaped groove depending therefrom;
   a hollow piercing element for piercing a top wall of the tubing placed in the U-shaped groove, the piercing element extending from the bottom face of the cover portion to a point above the platform arid in fluid communication with the outlet; and
   a means for securing the cover portion to the body portion;
   wherein securing the cover portion to the body portion produces a downward force on the piercing element without rotating the piercing element.

33. The system of claim 32 wherein said securing means comprises a plurality of gripping members extending down from side walls of the cover portion, said gripping members each comprising one or more locking protrusions, and said locking protrusions engage slots in the housing.

34. The system of claim 32 wherein the piercing element is integrated with the cover portion.

35. The system of claim 32 further comprising a nozzle attachment connected to the outlet.

36. The system of claim 32 wherein the piercing element is wedge shaped and aligned perpendicular to the tubing.

37. The system of claim 32 wherein the body portion is made of plastic.

38. The system of claim 32 wherein the housing further comprises a pair of approximately semi-cylindrical walls extending upward from opposite edges of the platform, wherein the cylindrical walls define a pair of opposite openings aligned along the center line.

39. The system of claim 32 wherein securing means comprises a plurality of locking clips.

40. The system of claim 32 wherein the piercing element is made of plastic.

41. The system of claim 32 wherein the piercing element is made of metal.

42. The system of claim 35 wherein the nozzle attachment is a flow control nozzle.

43. The system of claim 32 further comprising a deflector cap.

44. The system of claim 1 wherein the cap has a grip-enhancing outer surface.

45. The system of claim 32 further comprising a riser.

46. The system of claim 32 wherein the body portion is made of metal.

47. A method for installing a sprinkling system in an area to be watered, comprising:
   providing tubing for carrying a fluid, the tubing having a first end for connection to a fluid source and a second opposite end;
   providing a body portion comprising a housing and a spike depending downward from the housing, wherein the housing comprises a lower platform and an upwardly open U-shaped groove aligned along a center line of the platform for holding the tubing;

providing a saddle adapted to fit within the housing, the saddle comprising a top face having an outlet therein, a bottom face having downwardly open inverted U-shaped groove depending therefrom;

providing a hollow piercing element for piercing a top wall of the tubing placed in the U-shaped groove, the piercing element extending from the bottom face of the saddle to a point above the platform and in fluid communication with the outlet;

providing a cap adapted to fit over the saddle; and providing a means for securing the cap to the body portion;

inserting the spike into the ground in the area to be watered;

placing the tubing in the U-shaped groove;

placing the saddle and piercing element over the tubing; and securing the cap to the body portion to pierce the tubing with the piercing element without rotating the piercing element.

48. The method of claim 47 further comprising plugging the opposite end of the tubing with an end cap.

49. The method of claim 47 wherein the piercing element is integrated with the saddle.

50. The method of claim 47 wherein the securing means comprises a threaded engagement between the cap and the housing.

51. The method of claim 47 further comprising connecting a nozzle attachment to the outlet.

52. The method of claim 47 wherein the piercing element is wedge shaped and aligned perpendicular to the tubing.

53. The method of claim 47 wherein the body portion is made of plastic.

54. The method of claim 47 wherein the housing further comprises a pair of approximately semi-cylindrical walls extending upward from opposite edges of the platform, wherein the cylindrical walls define a pair of opposite openings aligned along the center line.

55. The method of claim 47 wherein securing means comprises a plurality of locking clips.

56. The method of claim 47 wherein the piercing element is made of plastic.

57. The method of claim 47 wherein the piercing element is made of metal.

58. The method of claim 51 wherein the nozzle attachment is a flow control nozzle.

59. The method of claim 47 further comprising attaching a deflector cap.

60. The method of claim 47 wherein the cap has a grip-enhancing outer surface.

61. The method of claim 47 further comprising attaching a riser to the outlet.

62. The method of claim 47 wherein the body portion is made of metal.

* * * * *